(12) United States Patent
Allen et al.

(10) Patent No.: US 9,030,480 B2
(45) Date of Patent: May 12, 2015

(54) TRIGGERING PERFORMANCE EVENT CAPTURE VIA PIPELINED STATE BUNDLES

(71) Applicant: NVIDIA Corporation, Santa Clara, CA (US)

(72) Inventors: Roger L. Allen, Lake Oswego, OR (US); Ziyad S. Hakura, Gilroy, CA (US); Thomas Melvin Ogletree, Lakeway, TX (US)

(73) Assignee: NVIDIA Corporation, Santa Clara, CA (US)

( * ) Notice: Subject to any disclaimer, the term of this patent is extended or adjusted under 35 U.S.C. 154(b) by 330 days.

(21) Appl. No.: 13/719,034

(22) Filed: Dec. 18, 2012

(65) Prior Publication Data

US 2014/0168231 A1 Jun. 19, 2014

(51) Int. Cl.
*G06F 15/80* (2006.01)
*G06T 1/20* (2006.01)

(52) U.S. Cl.
CPC ....................................... *G06T 1/20* (2013.01)

(58) Field of Classification Search
CPC ....... G06T 1/20; G06T 2210/52; G06F 15/16; G06F 9/4843; G09G 2352/00; G09G 2360/06
See application file for complete search history.

(56) References Cited

U.S. PATENT DOCUMENTS

| 6,885,376 | B2 * | 4/2005 | Tang-Petersen et al. | ..... 345/506 |
| 2004/0223003 | A1 * | 11/2004 | Heirich et al. | ................ 345/629 |

* cited by examiner

*Primary Examiner* — Hau Nguyen
(74) *Attorney, Agent, or Firm* — Artegis Law Group, LLP

(57) ABSTRACT

One embodiment of the present invention sets forth a method for analyzing the performance of a graphics processing pipeline. A first workload and a second workload are combined together in a pipeline to generate a combined workload. The first workload is associated with a first instance and the second workload is associated with a second instance. A first and second initial event are generated for the combined workload, indicating that the first and second workloads have begun processing at a first position in the graphics processing pipeline. A first and second final event are generated, indicating that the first and second workloads have finished processing at a second position in the graphics processing pipeline.

20 Claims, 12 Drawing Sheets

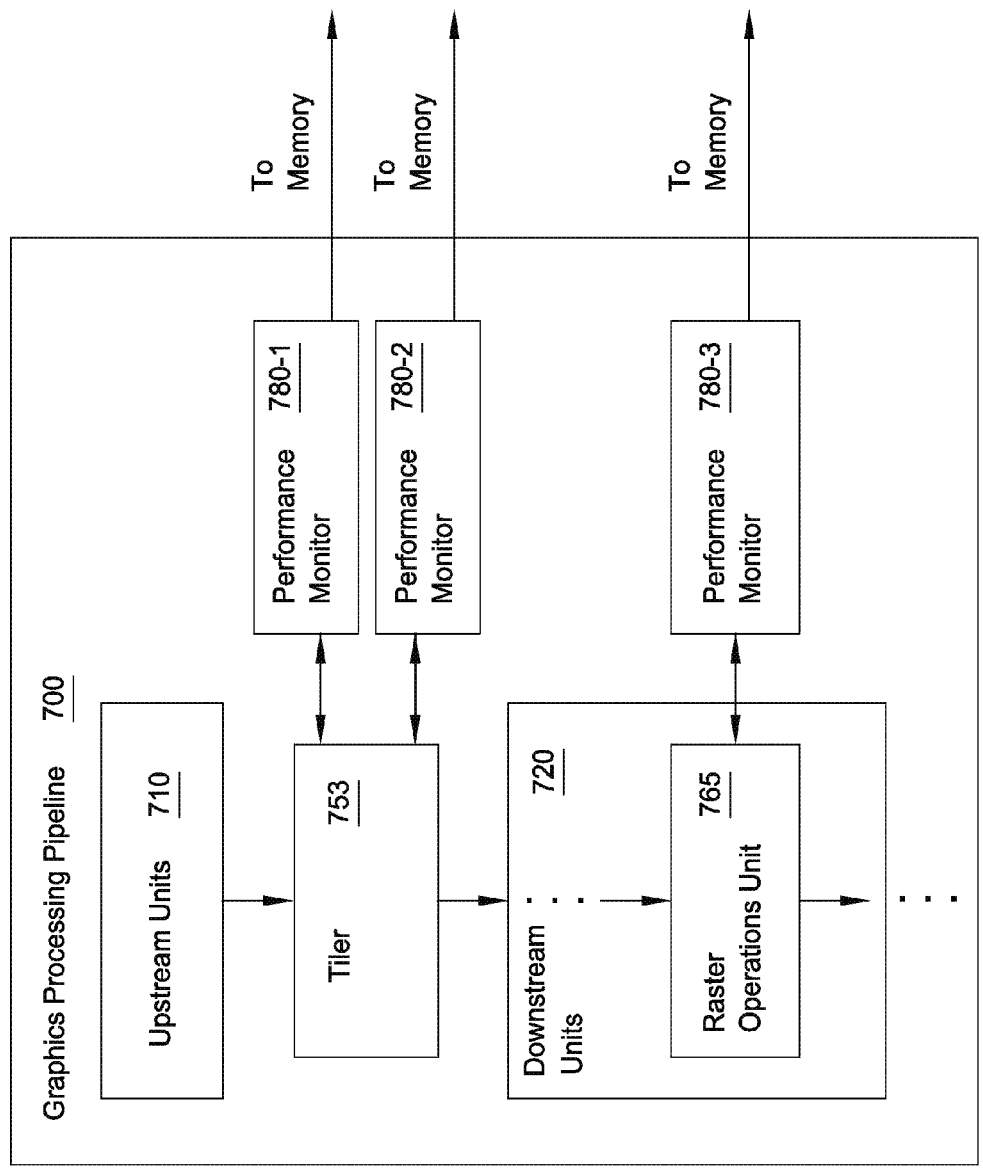

FIG. 8B

| Pid 852 | event# 854 | tstmp 856 | pbm 858 | pbmctr 860 | bm 862 | bmct 864 | ctr1 866 | ctr2 868 | |
|---|---|---|---|---|---|---|---|---|---|
| 1 | 1 | 50  | - | - | 1 | 1 | - | - | 829-1 |
| 1 | 2 | 165 | 1 | 1 | 2 | 1 | - | - | 829-2 |
| 1 | 3 | 260 | 2 | 1 | 3 | 1 | - | - | 829-3 |
| 2 | 1 | 275 | - | - | 1 | 1 | - | - | 825-1 |
| 3 | 1 | 300 | - | - | 1 | 1 | - | - | 835-1 |
| 2 | 2 | 305 | 1 | 1 | 2 | 1 | - | - | 825-2 |
| 3 | 2 | 328 | 1 | 1 | 2 | 1 | - | - | 835-2 |
| 1 | 4 | 328 | 3 | 1 | 4 | 1 | - | - | 829-4 |
| 2 | 3 | 333 | 2 | 1 | 3 | 1 | - | - | 825-3 |
| 3 | 3 | 359 | 2 | 1 | 3 | 1 | - | - | 835-3 |
| 2 | 4 | 361 | 3 | 1 | 1 | 2 | - | - | 827-1 |
| 3 | 4 | 390 | 3 | 1 | 1 | 2 | - | - | 837-1 |

FIG. 8C

| Pid 852 | event# 854 | tstmp 856 | pbm 858 | pbmctr 860 | bm 862 | bmct 864 | ctr1 866 | ctr2 868 | |
|---|---|---|---|---|---|---|---|---|---|
| 2 | 1 | 275 | - | - | 1 | 1 | - | - | 825-1 |
| 3 | 2 | 328 | 1 | 1 | 2 | 1 | - | - | 835-2 |

| Pid 852 | event# 854 | tstmp 856 | pbm 858 | pbmctr 860 | bm 862 | bmct 864 | ctr1 866 | ctr2 868 | |
|---|---|---|---|---|---|---|---|---|---|
| 2 | 2 | 305 | 1 | 1 | 2 | 1 | - | - | 825-2 |
| 3 | 3 | 359 | 2 | 1 | 3 | 1 | - | - | 835-3 |

| Pid 852 | event# 854 | tstmp 856 | pbm 858 | pbmctr 860 | bm 862 | bmct 864 | ctr1 866 | ctr2 868 | |
|---|---|---|---|---|---|---|---|---|---|
| 2 | 3 | 333 | 2 | 1 | 3 | 1 | - | - | 825-3 |
| 3 | 4 | 390 | 3 | 1 | 1 | 2 | - | - | 837-1 |

TRIGGERING PERFORMANCE EVENT CAPTURE VIA PIPELINED STATE BUNDLES

BACKGROUND OF THE INVENTION

1. Field of the Invention

The present invention generally relates to graphics chip performance analysis and, more specifically, to triggering performance event capture via pipelined state bundles.

2. Description of the Related Art

Graphics processing hardware typically includes circuitry known as a graphics processing pipeline. The graphics processing pipeline may be divided into stages. Information, including graphical data and instructions, passes through the graphics processing pipeline from the earliest stage to the latest stage, and each stage processes the information by performing various associated functions and operations on the information. Stages can operate independently from one another, which enables the different stages to process different information at the same time. Processing different information simultaneously in this manner increases utilization of the graphics processing pipeline, which improves performance.

A graphics processing pipeline may be configured to provide "performance data" related to how efficiently graphics data is being processed in the graphics processing pipeline. Such performance data may include the time required to complete a specific task, the amount of data processed during a certain period of time, and other like measurements. Typically, performance data is obtained regarding a particular unit of work. Such a unit of work may be an "instance," which, as used herein, refers to a set of related graphics processing pipeline methods (such as draw calls) that are all performed on a certain rendering "state".

With some conventional graphics processing pipeline architectures, performance data may be analyzed instance-by-instance. An instruction to begin monitoring performance may be sent into the graphics processing pipeline, along with an instance for which performance data is desired. The time at which the instance is sent into the graphics processing pipeline and the time at which the results of the processed instance exit the graphics processing pipeline may be used to determine how much time is required to process the instance. In addition, counters for counting specific items of work completed when processing the instance, such as the number of pixels shaded, and the like, may also be recorded.

However, with some graphics processing pipeline architectures, the graphics processing pipeline may include a unit, known as a tiler unit, at an intermediate position in the graphics processing pipeline. The tiler unit is configured to receive graphical data from a first portion of the graphics processing pipeline and organize the graphical data into mutually exclusive constructs known as "tiles." To do this, a tiler unit may accumulate graphical data and instructions from several instances that are sent into the graphics processing pipeline, subdivide and interleave the instances together to produce a combined workload, and send the combined workload into a second portion of the graphics processing pipeline. The second portion of the graphics processing pipeline processes data tile-by-tile, rather than instance-by-instance.

The presence of a tiler unit may make conventional performance monitoring, as described above, near impossible because the work being processed in the graphics processing pipeline downstream of the tiler unit is tile-based, not instance-based. In other words, because downstream stages in the graphics processing pipeline are processing a given tile at a time, as opposed to a particular instance, timestamps for when a tile enters and exits a given stage of the graphics processing pipeline may provide a total time related to processing several instances, as opposed to providing information about the time required to process a specific instance. Similarly, counters associated with a downstream stage of the graphics processing pipeline would provide counts related to processing several instances, as opposed to providing counts related to processing a specific instance. Without information related to how specific instances are processed in the graphics processing pipeline, debugging the graphics processing pipeline and analyzing ways to improve graphics processing pipeline performance are much more difficult.

As the foregoing illustrates, what is needed in the art is a way to obtain performance data related to graphics processing pipeline workloads in a tile-based system.

SUMMARY OF THE INVENTION

One embodiment of the present invention sets forth a method for analyzing the performance of a graphics processing pipeline. A first workload and a second workload are combined together in a pipeline to generate a combined workload. The first workload is associated with a first instance and the second workload is associated with a second instance. A first and second initial event are generated for the combined workload, indicating that the first and second workloads have begun processing at a first position in the graphics processing pipeline. A first and second final event are generated, indicating that the first and second workloads have finished processing at a second position in the graphics processing pipeline.

One advantage of the disclosed approach is that performance data may be obtained for a single instance within a combined set of instances for a pipeline with a tiler unit that subdivides instances into tiles and interleaves tiles from different instances.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 illustrates a graphics processing pipeline with a tiler unit, according to one embodiment of the present invention;

FIG. 8B is a block diagram depicting example events generated by local performance monitors in a graphics processing pipeline, according to one embodiment of the present invention;

FIG. 8C is a block diagram depicting events generated by a graphics processing pipeline, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
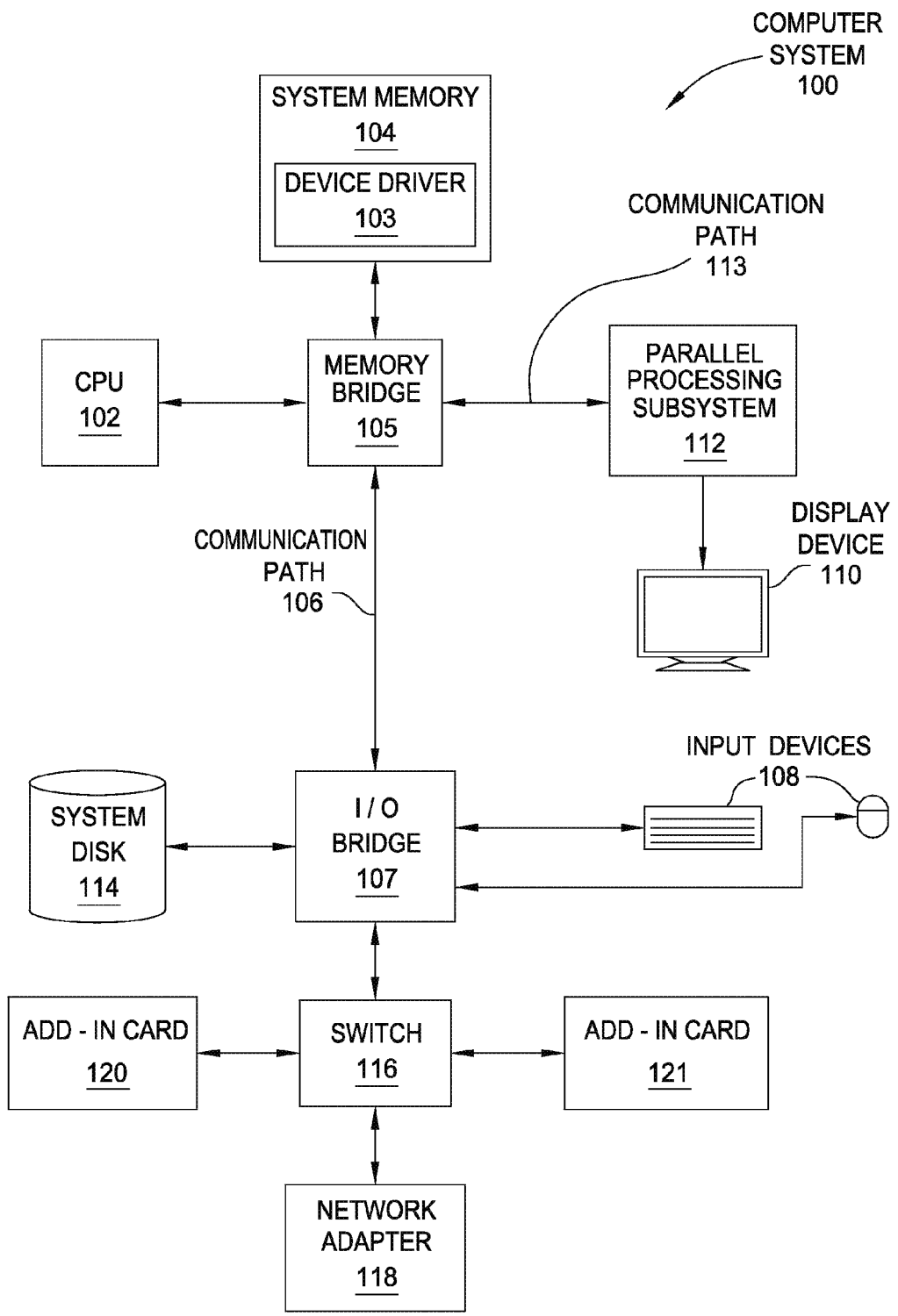
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

A compiler 101 may be embedded within device driver 103. Compiler 101 compiles program instructions as needed for execution by parallel processing subsystem 112. During such compilation, compiler 101 may apply transforms to program instructions at various phases of compilation. In another embodiment of the present invention compiler 101 may be a stand-alone application.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
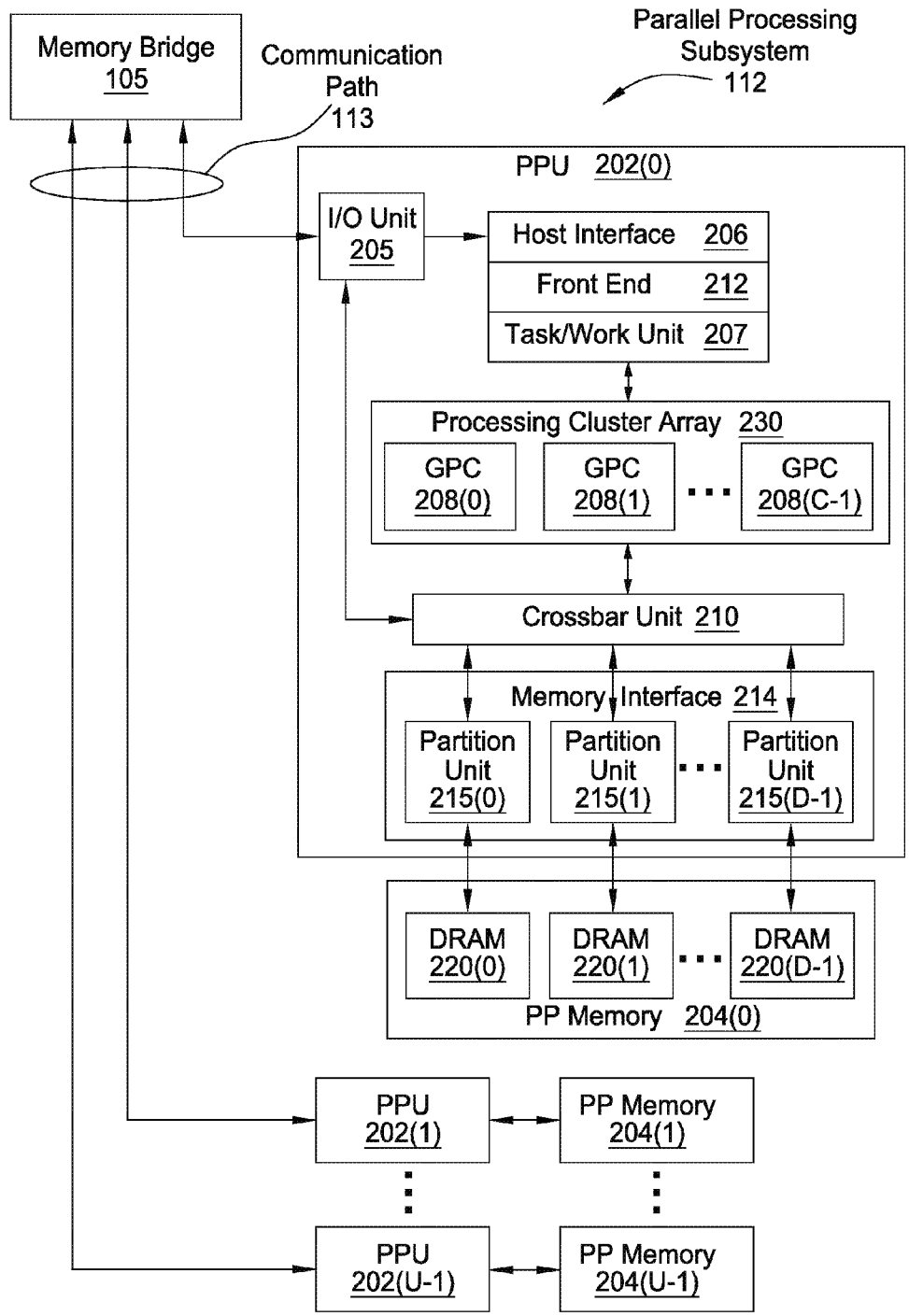
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) (not shown) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
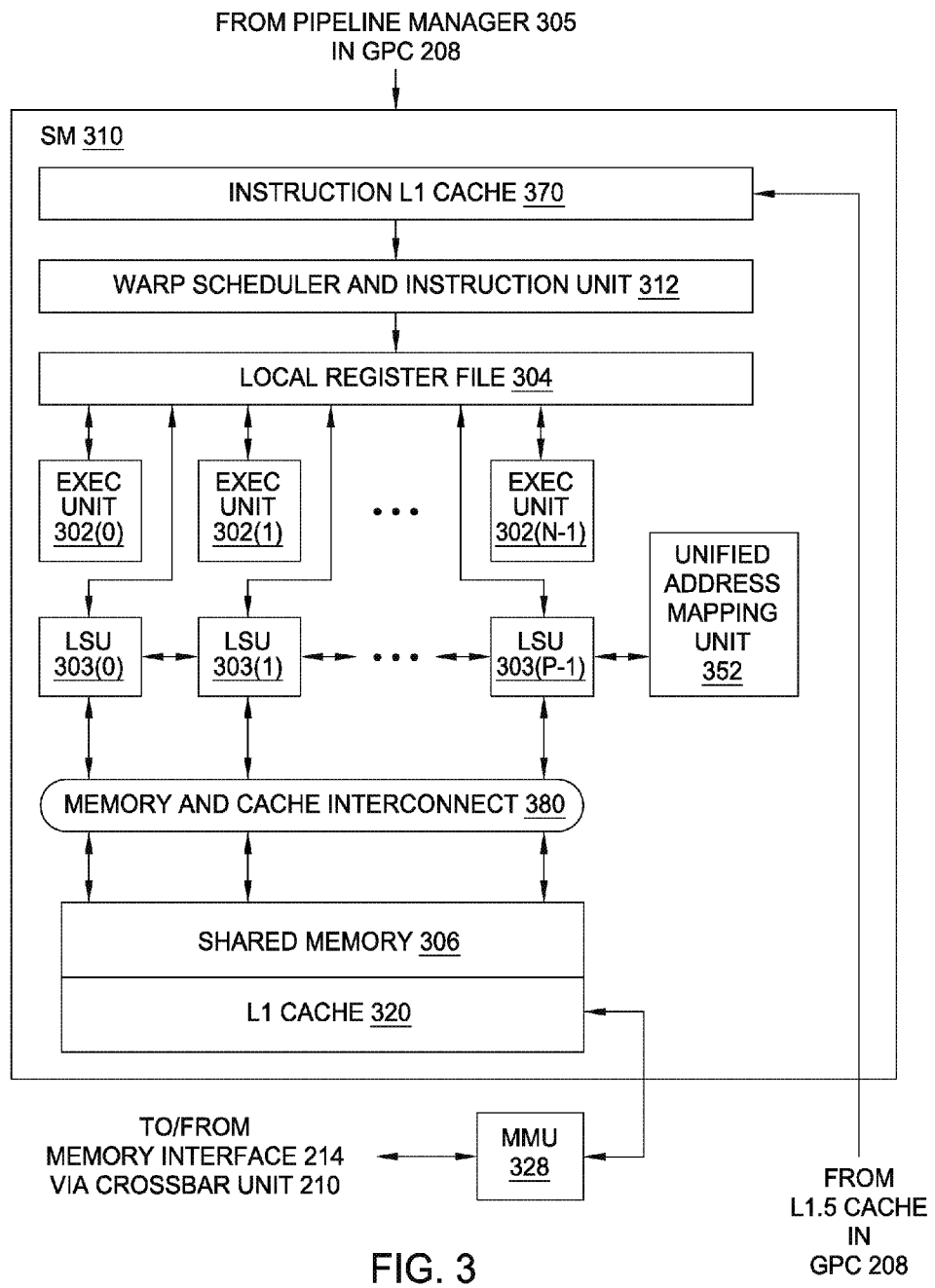
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPO 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPO 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPO 208 that includes $\underline{M}$ streaming multiprocessors 310, up to G*M thread groups can be executing in GPO 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register the 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 320 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Graphics Pipeline Architecture

Figure 4:
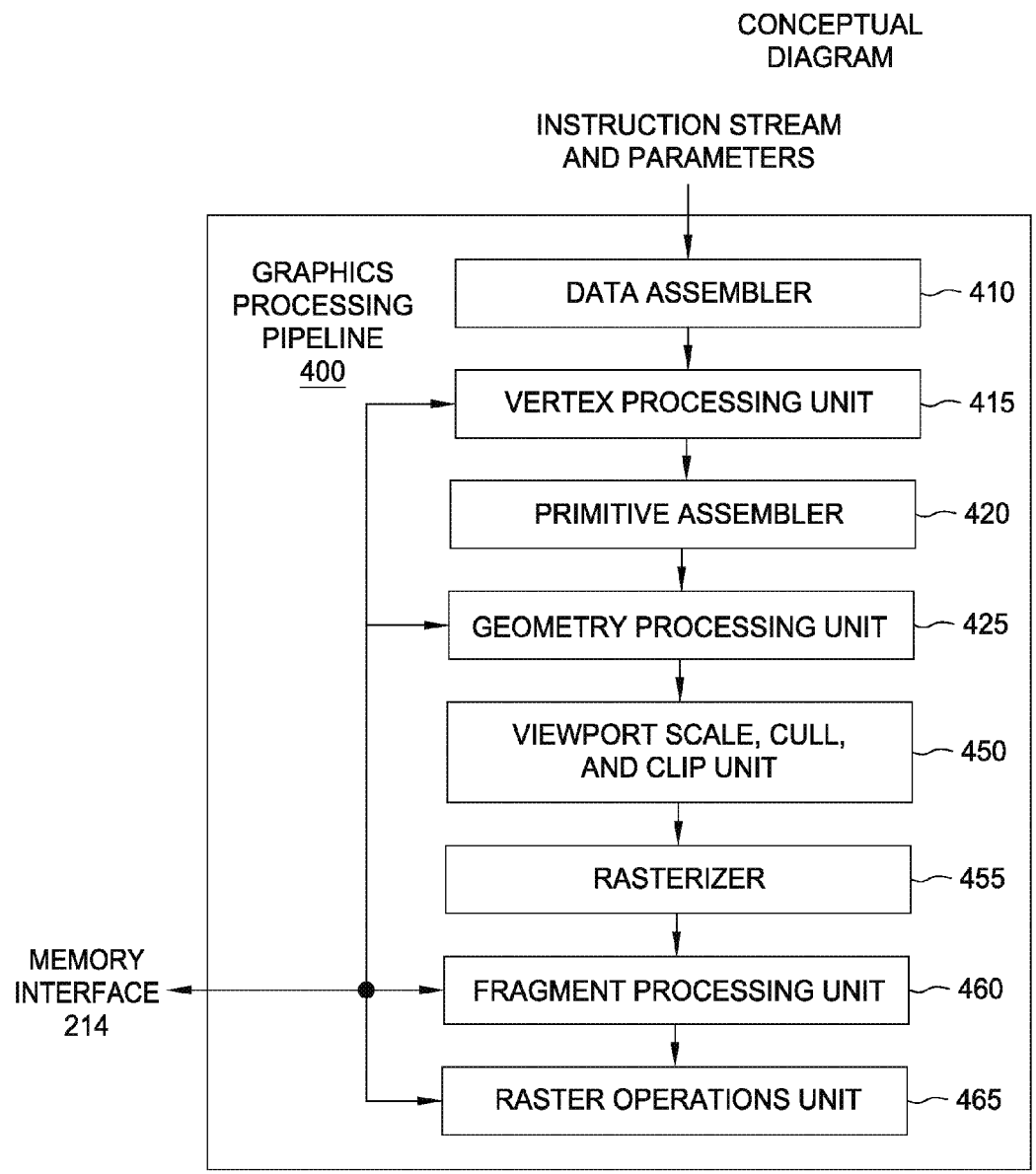
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Graphics processing pipeline 400 is configured to analyze performance characteristics of an "instance", which is a collection of related methods such as "draw calls" performed on a certain "state". Methods include calls sent by driver 103 to command graphics processing pipeline 400 to draw certain objects. Methods also include instructions to change a rendering state. An instance typically includes one or more methods to set a particular rendering state, and one or more draw calls to be completed in that rendering state.

To analyze performance of an instance, driver 103 issues a wait-for-idle method, followed by a "PMTrigger" method, followed by an instance, followed by a wait-for-idle method, followed by a "PMTrigger" method. The "wait-for-idle" method causes the pipeline to wait until the graphics processing pipeline is clear of data and instructions before processing additional methods sent into the graphics processing pipeline. The PMTrigger (or "performance monitor trigger") method causes graphics processing pipeline 400 to toggle (enter or exit) a performance monitoring mode in which graphics processing pipeline 400 provides performance data for the methods processed by the graphics processing pipeline 400. An method to change the state causes the methods sent subsequent to the state change instruction to be processed on the state for which the change is requested. Together, the methods that driver 103 issues into graphics processing pipeline 400 cause the graphics processing pipeline 400 to isolate an instance for analysis, and to process that instance and generate performance data.

Performance data is obtained regarding what time the instance entered the graphics processing pipeline 400, and what time the instance exits the graphics processing pipeline 400. These two times allow the determination of a processing time for an instance. Performance data may also include one or more counts of specific units of work completed by graphics processing pipeline 400 while processing an instance. Such units of work may include pixels shaded, for example.

Triggering Performance Event Capture for Tiled Workloads

Figure 5:
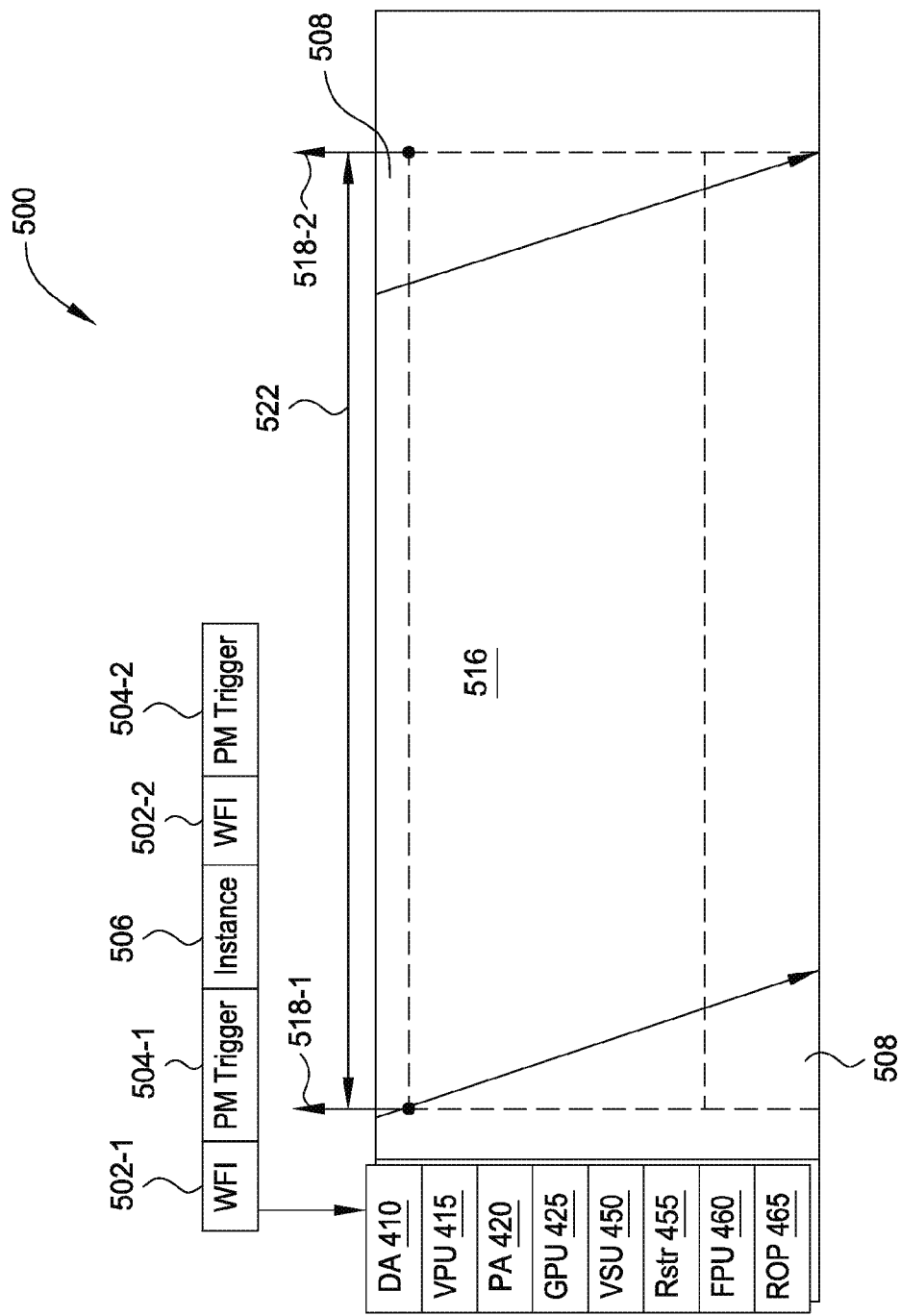
FIG. 5 is a graph showing data flow through a graphics processing pipeline, over time, according to one embodiment of the present invention.

FIG. 5 is a graph showing data flow through graphics processing pipeline 400, over time, according to one embodiment of the present invention. Driver 103 sends a wait-for-idle method 502-1, a PM Trigger method 504-1, an instance 506, a second wait-for-idle method 502-2, and a second PM Trigger method 504-2. The wait-for-idle method 502-1 causes the pipeline 400 to flush all data. Thus, the graph begins with no data in the graphics processing pipeline 400, as indicated by idle areas 508. When graphics processing pipeline 400 is clear, graphics processing pipeline 400 begins processing the instance 506. Block 516 represents data flow through the stages of the graphics processing pipeline 400 related to the instance 506. Lines 518-1 and 518-2 indicate the time of entry and exit of the instance, respectively. Together, lines 518-1 and 518-2 can be used to determine a total elapsed time 522 for instance 506.

Figures 6A, 6B:
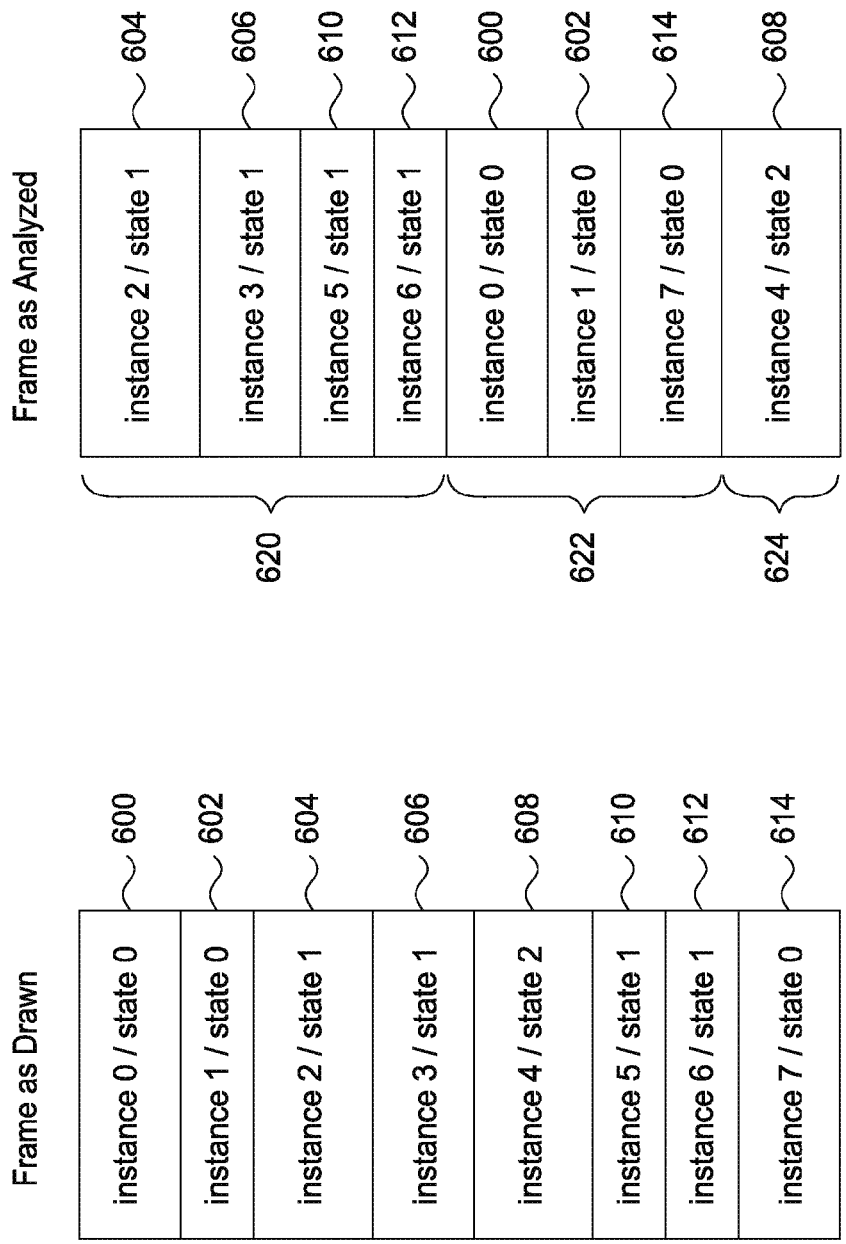
FIG. 6A is a conceptual diagram of a graphics frame indicating multiple blocks, each representing a different instance, and graphically representing how much time a graphics processing pipeline takes to process each instance.
FIG. 6B is a conceptual diagram of a graphics frame indicating the instances shown in FIG. 6A, but rearranged to emphasize graphics processing pipeline performance in each state.

FIG. 6A is a conceptual diagram of a graphics frame indicating multiple blocks 600, 602, 604, 606, 608, 610, 612, and 614, each representing a different instance, and graphically representing how much time graphics processing pipeline 400 takes to process each instance. The instances depicted in FIG. 6A may comprise instances for drawing a particular frame. Graphics processing pipeline 400 processes multiple instances in multiple different states to draw the frame. Instances corresponding to blocks 600, 602, 614 are drawn in state 0, instances corresponding to blocks 604, 606, 610, and 612 are drawn in state 1 and instance corresponding to block 608 is drawn in state 2.

FIG. 6B is a conceptual diagram of a graphics frame indicating the instances shown in FIG. 6A, but rearranged to emphasize graphics processing pipeline 400 performance in each state. Performance analysis may consist of determining how much time graphics processing pipeline 400 takes to perform work in each state. Thus, FIG. 6B indicates a total amount 620 of time for processing in state 1, a total amount of time 622 for processing in state 0, and a total amount of time 624 for processing in state 2.

With the graphics processing pipeline described in conjunction with FIGS. 5-6B, the processing time spent on a particular state is easy to determine, as are counts of particular types of work, as work is processed instance-by-instance. However, as described with respect to FIGS. 7-10, wherein a graphics processing pipeline that performs thing is discussed, the processing time for a particular state is not as easy to determine, as work is processed tile-by-tile. FIGS. 7-10 thus provide techniques for analyzing performance of a graphics pipeline in which tiling is performed.

FIG. 7 illustrates a graphics processing pipeline 700 with a tiler unit 753, according to one embodiment of the present invention. As shown, the graphics processing pipeline 700 comprises upstream units 710, a tiler unit 753, and downstream units 720. Upstream units 710 may include units such as a data assembler (not shown), vertex processing unit (not shown), primitive assembler (not shown), geometry processing unit (not shown), and viewport scale, cull, and dip unit (not shown). Downstream units 720 may include units such as a rasterizer (not shown), fragment processing unit (not shown), and raster operations unit 765. Tiler unit 753 receives primitives from upstream units 710. Tiler unit 753 combines primitives that may be associated with different instances, and reorganizes the primitives based on which "tiles" the primitives belong in. Tiles are sections of a screen with which primitives are associated. Tiler unit 753 waits until primitives from multiple instances have reached tiler unit 753 and determines how to combine those primitives together. Tiler unit 753 combines primitives into tracts for processing by downstream units 720. Tiler unit 753 combines tracts into tiles, where each tract represents a portion of the tile that is derived from the same instance.

Because of the nature of tiles, whole instances are not processed all at once in downstream units. Entry and exit times for tiles do not necessarily provide information regarding the processing time for instances, and total processing time for instances cannot be generated in a similar manner as is described with respect to FIGS. 5-6B. To allow for determination of performance related data for a graphics processing pipeline with a tiler unit, embodiments of the invention contemplate propagating local performance monitor trigger methods, having bookmarks, through the graphics processing pipeline. Local performance monitors coupled to various units within the graphics processing pipeline detect the local performance monitor trigger method and bookmarks and generate performance events with data related to processing tiles and instances.

Tiler unit 753 is coupled to two local performance monitors, 780-1, 780-2. Local performance monitor 780-1 is coupled to an entry point of tiler unit 753 and local performance monitor 780-2 is coupled to an exit point of tiler unit 753. A third local performance monitor 780-3 is coupled to raster operations unit (ROP) 765 in downstream units 720 of graphics processing pipeline 700.

Driver 103 is configured to send a local performance trigger method (also referred to herein collectively as "PMLocalTrigger(bookmark)") through graphics processing pipeline 700. Local performance trigger method has a bookmark that identifies the instance with which the local performance trigger methodic associated. Units in graphics processing pipeline 700 are configured to propagate PMLocalTrigger (bookmark) method through graphics processing pipeline 700. Performance monitors 780 are configured to detect PMLocalTrigger(bookmark) and to generate a performance event in response to receipt of PMLocalTrigger(bookmark).

The performance event serves to identify the time at which a tract has reached a particular unit in the graphics processing pipeline 700. The performance event comprises data that identifies which local performance monitor generated the event (a "performance monitor ID"), the value of the bookmark of the PMLocalTrigger(bookmark) that triggered generation of the event, the timestamp representing the time at which the performance event is generated, and one or more counters for recording additional data as desired. The timestamp allows the determination of the time at which a tract has passed by the unit that generated the performance event. The bookmark allows the determination of the instance with which the timestamp is associated. The performance monitor ID identifies which unit generated the event. The counters may be used as desired, and may be used to record how many units of a particular type of work have been performed in a particular amount of time, for example. The event also includes a prior bookmark value that indicates which instance the previous event sent by the local performance monitor was associated with. The event also includes counters for the bookmark and for the prior bookmark that indicate the number of times an event associated with a particular bookmark value has been sent. Together, bookmark and bookmark counter indicates a particular tract.

Driver 103 is configured to send one PMLocalTrigger (bookmark) method at the beginning of every instance. However, because there may be multiple tracts associated with every instance, the PMLocalTrigger(bookmark) method sent by driver 103 only causes local performance monitors 780 to generate an event for the first tract that is associated with a particular instance. Thus, tiler unit 753 is configured to "replay" the PMLocalTrigger(bookmark) method sent by the driver 103 every time a tract after the first tract associated with a particular instance is sent into downstream units 720. The "replay" of the PMLocalTrigger(bookmark) method is a copy of the PMLocalTrigger(bookmark) method that was sent for the first tract in an instance sent into downstream units 720. The replay PMLocalTrigger(bookmark) thus is also propagated through downstream units 720 and also causes local performance monitors 780 in downstream units 720, such as local performance monitor 780-3 in ROP 765, to generate a performance event containing performance related data such as performance monitor ID, the value of the bookmark, the timestamp when the performance event is generated, and one or more counters for recording additional data as desired.

Local performance monitors 780 send the performance events to memory for analysis by software or hardware modules configured to analyze performance data. In one embodiment, a standalone application running on a computer may receive the performance events and generate performance metrics. In another embodiment, driver 103 receives the performance events and generates performance metrics.

Figure 8A:
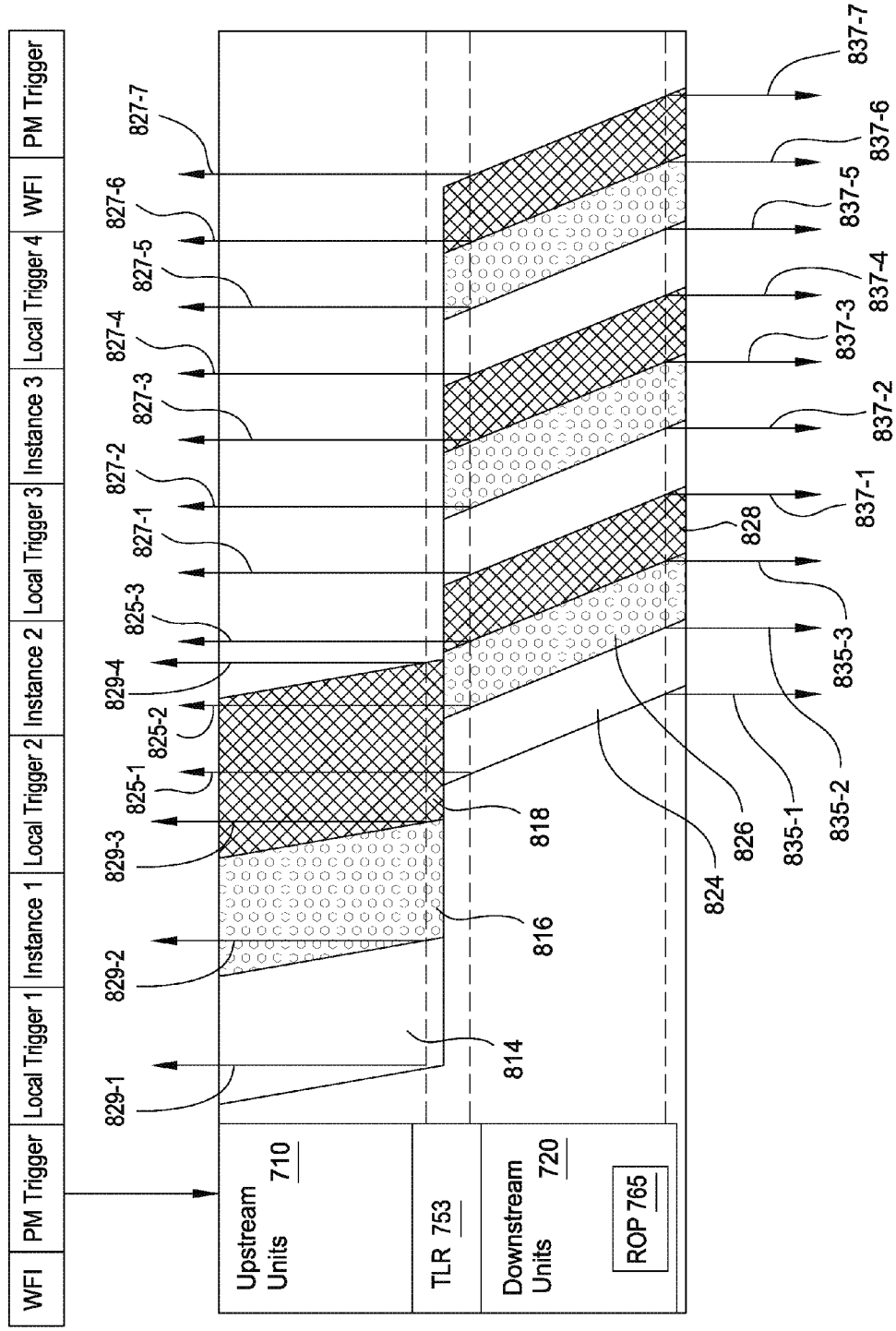
FIG. 8A is a graph depicting the performance monitoring operation of a graphics processing pipeline, depicting data flow through the pipeline over time, according to one embodiment of the present invention.

FIG. 8A is a graph depicting the performance monitoring operation of graphics processing pipeline 700, depicting data flow through the pipeline over time, according to one embodiment of the present invention. Driver 103 sends a wait-for-idle method, a performance monitor trigger method, local performance trigger methods and instances, and another wait-for-idle method and a performance monitor trigger method. Upstream units 710 process data related to the instances. The data processed by upstream units 710 includes data 814, related to instance 1, data 816, related to instance 2, and data 818, related to instance 3. Further, upstream units 710 propagate a local performance trigger method with data 814, a local performance trigger method with data 816, and a local performance trigger method with data 818. Tiler unit 753 combines data 814, 816, 818 and emits tracts 824, 826, 828 into downstream units 720. Tiler unit 753 sends local performance trigger methods and replays the local performance trigger methods into downstream units 720. ROP 765 processes acts 824, 826, 828.

Tiler unit 753 receives local performance trigger methods from upstream units 710. Local performance monitor 780-1 generates events 829 upon receiving local performance trigger methods. Tiler unit 753 propagates local performance trigger methods to downstream units 720. When tracts 824, 826, 828 are emitted, local performance monitor 780-2 generates events 825, 827. Events 825 are the events generated when local performance trigger methods are propagated from tiler unit 753. Events 827 are the events generated when replays are propagated from tiler unit 753. Events 835 are the events generated when local performance trigger methods reach ROP 765. Events 837 are the events generated when replay methods reach ROP 765.

The timestamps from events that "border" each tract provide information regarding the processing duration for each tract. The timestamp from the event generated by the local performance monitor 780-2 coupled to the exit point of tiler unit 753 can be subtracted from the timestamp from the event generated by the local performance monitor 780-3 coupled to ROP 765 to obtain the processing duration between tiler unit 753 and ROP 765. For each tract, events are generated when the tract first arrives at (begins processing at) and leaves (ends processing at) a particular unit. A processing duration for a tract in downstream units 720 can be obtained by subtracting the timestamp generated when the tract begins processing at local performance monitor 780-2 at the end of the tiler unit 753 from the timestamp from the event generated when a tract ends processing at local performance monitor 780-3 coupled to ROP 765.

FIG. 8B is a block diagram depicting example events generated by local performance monitors 780 in graphics processing pipeline 700, according to one embodiment of the present invention. The events listed in FIG. 8B are generated by multiple local performance monitors 780 and are shown in a global chronological order. As can be seen, the timestamp 856 increases from the top-most event to the bottom-most event. Each event comprises a performance monitor ID 852, an event ID 854, a timestamp 856, a prior bookmark number 858 and prior bookmark counter 860, a bookmark number 862 and bookmark counter 864, and one or more performance monitoring counters 866 and 868.

Performance monitor ID 852 indicates which performance monitor generates the event. Event ID 854 indicates the number of the event. A first event generated by a performance monitor may have an Event ID of 1, a second event generated by the same performance monitor may have an Event ID of 2, and so on. Timestamp 856 indicates the time at which the event is generated. In FIGS. 8B and 8C, the time is shown in arbitrary units of time. Events may store time in clock cycles, in units of time, or in another manner.

The bookmark number 862 is the bookmark value that is detected by the local performance monitor 780, and that propagates through graphics processing pipeline 700 with the PMLocalTrigger(bookmark). Local performance monitors 780 store counters for each bookmark value and include the bookmark counter 864 in the event. For example, when a first event is generated having a first bookmark value, the count value is 1, when a second event is generated having the same first bookmark value, the count value is 2. The prior bookmark 858 indicates the bookmark number of the event that was generated immediately before the current event at a particular local performance monitor 780. Therefore, if a local performance monitor generates a first event having a bookmark of 2, and then generates a second event having a bookmark of 3, the prior bookmark number for the second event is 2. The prior bookmark number serves to indicate which tract was previously processed by a certain portion of graphics processing pipeline 700 and the bookmark number serves to indicate which tract is processed next by the same portion of graphics processing pipeline 700. Prior bookmark counter 860 stores the number of times an event was issued with a particular prior bookmark value, in a similar manner as for the bookmark value 862 and bookmark counter 864.

The combination of a specific bookmark 862 value and bookmark counter 864 value uniquely indicates which tract comes after the event, while the combination of a specific prior bookmark 858 value and prior bookmark counter 860 value uniquely indicates which tract comes before the event. A special prior bookmark value may be used to indicate that no tract came before the event, for example, when the pipeline was empty because of a wait-for-idle signal. In FIG. 8B, this special prior bookmark value is indicated with "–".

Performance monitoring counters 866, 868 are general use counters that can be used by the local performance monitors to record any value as desired. No value is shown in FIGS. 8B and 8C, but any value may be counted by performance monitoring counters 866, 868.

Event 825-1 has a bookmark value that corresponds to instance 1, indicating that the tract after event 825-1 is associated with instance 1. The bookmark counter in event 825-1 indicates that the tract 824 that comes after event 825-1 is the first tract sent into downstream units 720 that is associated with instance 1. The prior bookmark and prior bookmark counter indicates that nothing preceded the first tract sent associated with instance 1. Event 825-1 has a timestamp that indicates when tract 824-1 is sent from tiler unit 753 into downstream units 720.

Event 835-2 has a prior bookmark value that corresponds to instance 1, indicating that the tract processed by ROP 765 prior to generation of event 835-2 is associated with instance 1. Event 835-2 also has a counter that indicates which tract associated with instance 1 is associated with event 835-2. The counter value indicates that the tract that is processed by ROP 765 prior to generation of event 835-2 is the first tract 824-1 associated with instance 1. Event 835-2 also has a timestamp that indicates when event 835-2 is generated.

FIG. 8C is a block diagram depicting events generated by graphics processing pipeline 700, according to one embodiment of the present invention. Taken together, event 825-1, which is generated by tiler unit 753, and event 835-2, which is generated by ROP 765, indicate an elapsed time from the sending of tract 824 into downstream units 720 until the processing of tract 824 by ROP 765. Event 825-1 is generated when tract 824 begins processing by downstream units 720 and event 835-2 is generated when tract 824 ends processing by downstream units 720. Similarly, event 825-2 and event 835-3 indicate an elapsed time from the sending of tract 826 into downstream units 720 until the processing of tract 826 by ROP 765. Events 825-3 and 837-1 indicate an elapsed time for tract 828. Other events 825, 827, 835, and 837 indicate elapsed times for other tracts.

As can be seen, events from a first unit can be paired with events from a second unit that is further downstream to determine an elapsed time for a tract between the two units. The bookmark and bookmark counter value in the event from the first unit is compared with the prior bookmark and prior bookmark counter values in events from the second unit. If the values in the bookmark 862 and bookmark counter 864 in the event from the first unit match the values in the prior bookmark 858 and prior bookmark counter 860 in the event from the second unit, then the first and second events "border" a tract. The first event provides a timestamp for the time at which the tract passed the first unit, and the second event provides a timestamp for the time at which the tract passed the second unit. The instance with which the tract is associated is provided by the bookmark 862 value for the first event, and the tract number is provided by the bookmark count value 864 for the first event.

Data in events 825-1, 835-2 indicate that the elapsed time for tract 1 associated with instance 1 is 328−275=53 time units. Data in events 825-2 and 835-3 indicate that the elapsed time for tract 1 associated with instance 2 is 359−305=54 time units. Data in events 825-3 and 837-1 indicate that the elapsed time for tract 1 associated with instance 3 is 390−333=57 time units. A total time for processing of an instance between the first unit and the second unit can be determined by adding up the elapsed times for all tracts sent by the tiler unit 753 associated with that instance.

Figure 9:
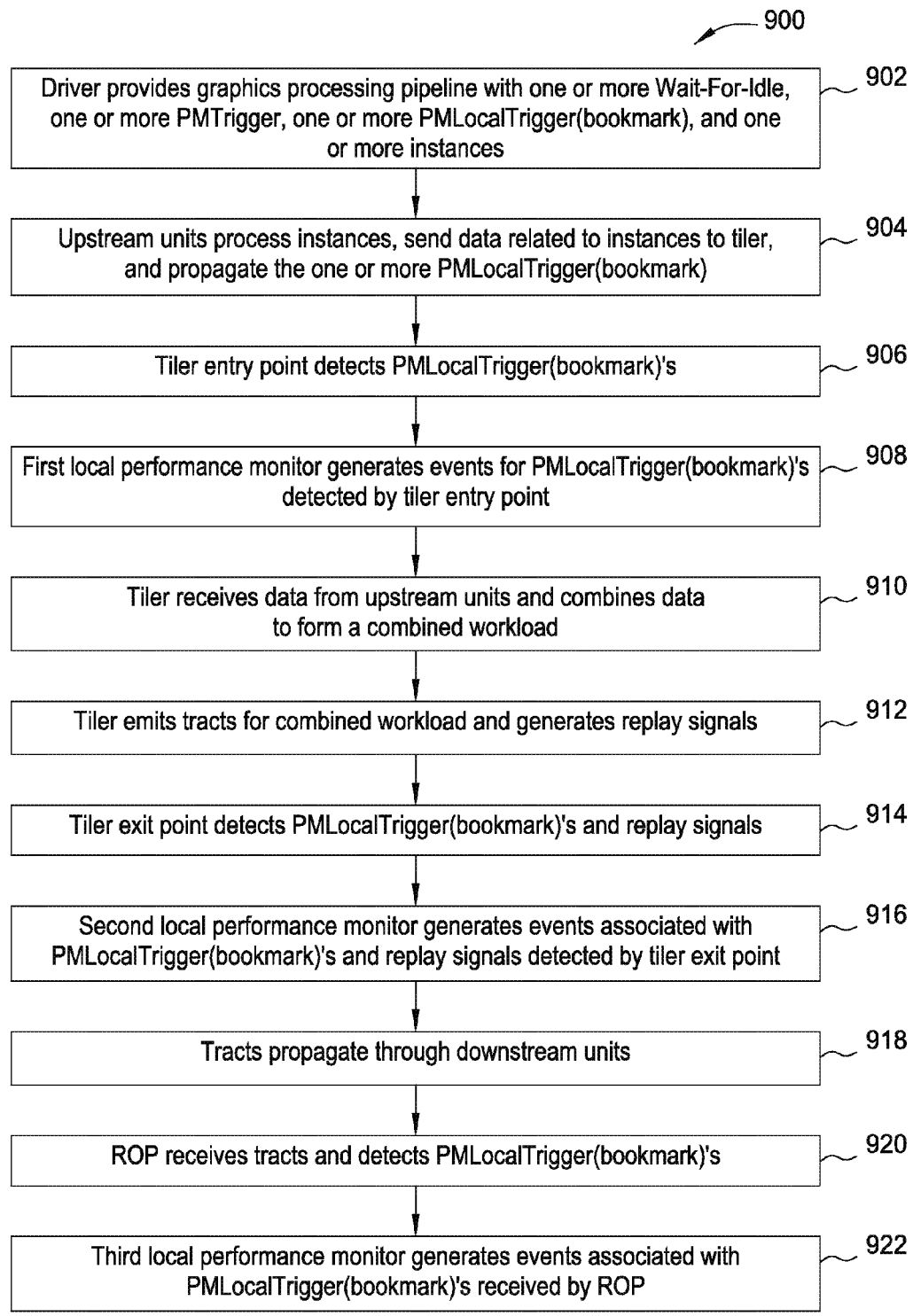
FIG. 9 is a flow diagram of method steps for analyzing performance of a graphics processing pipeline, according to one embodiment of the present invention.

FIG. 9 is a flow diagram of method steps for analyzing performance of a graphics processing pipeline 700, according to one embodiment of the present invention. Although the method steps are described in conjunction with FIGS. 1-4 and 7-8B, persons skilled in the art will understand that any system configured to perform the method steps, in any order, falls within the scope of the present invention.

As shown, the method 900 begins in step 902, where driver 103 provides graphics processing pipeline 700 with one or more wait-for-idle methods, one or more PMTrigger methods, one or more PMLocalTrigger(bookmark) methods, and one or more instances. The PMLocalTrigger(bookmark) methods precede each instance, and the bookmark value is a value that identifies the instance that the PMLocalTrigger (bookmark) method precedes.

In step 904, upstream units 710 in graphics processing pipeline 700 process instances to generate data. PMLocalTrigger(bookmark) methods also arrive at tiler unit 753. In step 906, tiler unit 753 entry point detects PMLocalTrigger (bookmark) methods. In step 908, a first local performance monitor 780-1, coupled to tiler unit 753 entry point, generates events for PMLocalTrigger(bookmark) methods detected by tiler unit 753 entry point. In step 910, tiler unit 753 receives data from upstream units 710 and combines data to form a combined workload. In step 912, tiler unit 753 emits tracts for the combined workload and generates replays. Step 912 is described in more detail below with respect to FIG. 10.

In step 914, tiler unit 753 exit point detects PMLocalTrigger(bookmark) methods and replays. In step 916, second local performance monitor 780-2, coupled to tiler unit 753 exit point, generates events associated with the PMLocalTrigger(bookmark) methods and replays detected by tiler unit 753 exit point. In step 918, tracts propagate through downstream units 720. In step 920, ROP 765 receives tracts and detects PMLocalTrigger(bookmark) methods. In step 922, third local performance monitor 780-3 generates events associated with PMLocalTrigger(bookmark) methods and replays received by ROP 765.

Figure 10:
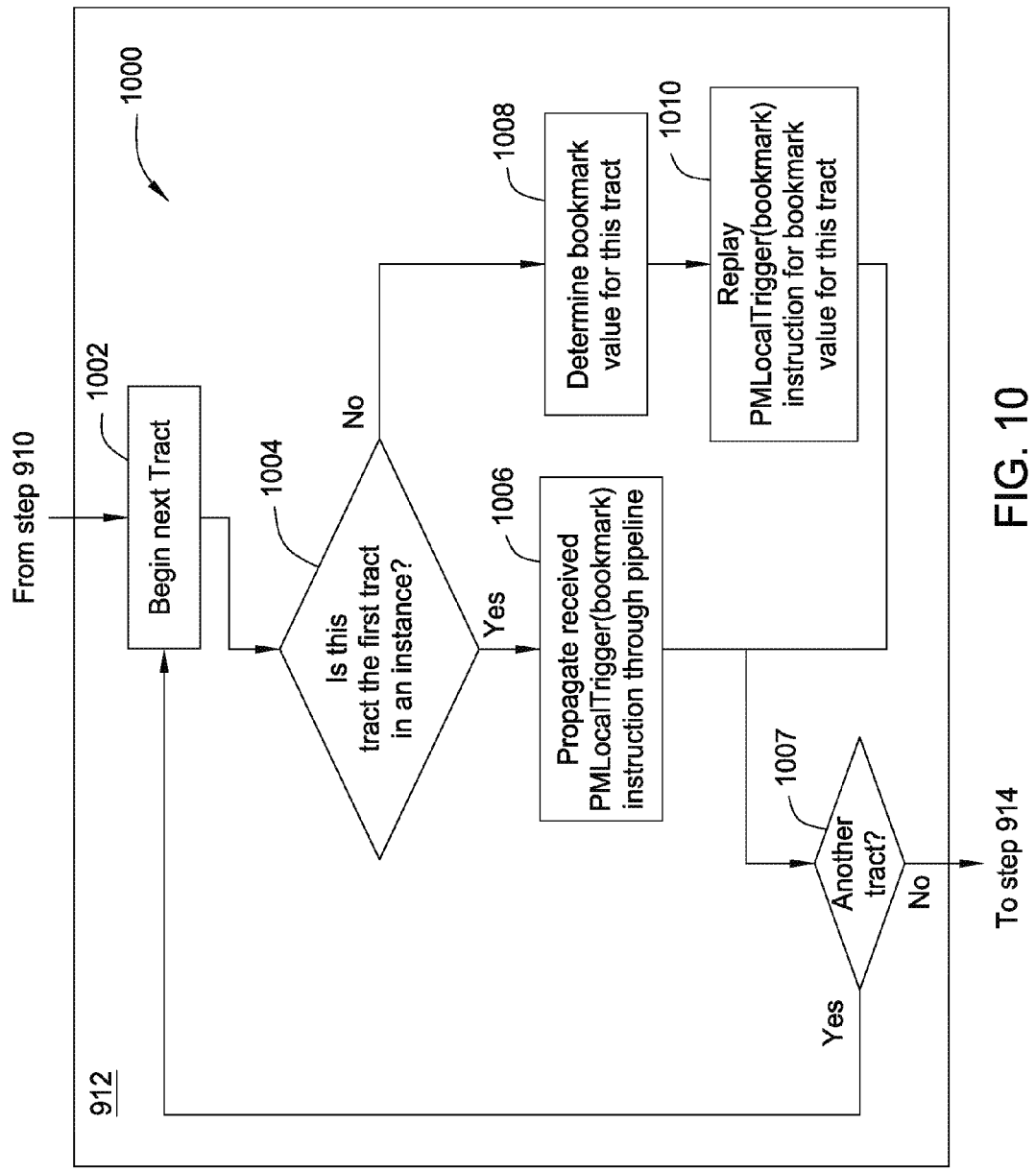
FIG. 10 is a flow diagram of method steps for emitting tracts and generating replay signals, according to one embodiment of the present invention.

FIG. 10 is a flow diagram of method steps for performing step 912 of FIG. 9, including emitting tracts, and generating replays, according to one embodiment of the present invention. Although the method steps are described in conjunction with FIGS. 1-4 and 7-8B, persons skilled in the art will understand that any system configured to perform the method steps, in any order, falls within the scope of the present invention.

As shown, a method 1000 begins in step 1002, where tiler unit 753 issues a tract to downstream units 720. In step 1004, the tiler unit 753 checks whether the tract is the first tract to be sent to downstream units 720 associated with a particular instance. If the tract is the first tract in an instance, a PMLocalTrigger(bookmark) method is in graphics processing pipeline 700, tiler unit 753 does not generate a replay, and the method proceeds to step 1006. In step 1006, tiler unit 753 propagates the PMLocalTrigger(bookmark) method to downstream units 720. In step 1007, tiler unit 753 checks whether tiler unit 753 is about to propagate another tract into downstream units 720. If tiler unit 753 is about to propagate another tract, the method loops back to step 1002.

If in step 1004, the tract is not the first tract in an instance, the method 1000 proceeds to step 1008. In step 1008, tiler unit 753 determines the bookmark value for the current tract. In step 1010, tiler unit 753 replays the PMLocalTrigger(bookmark) method for the current tract. The method then proceeds to step 1007.

Figure 11:
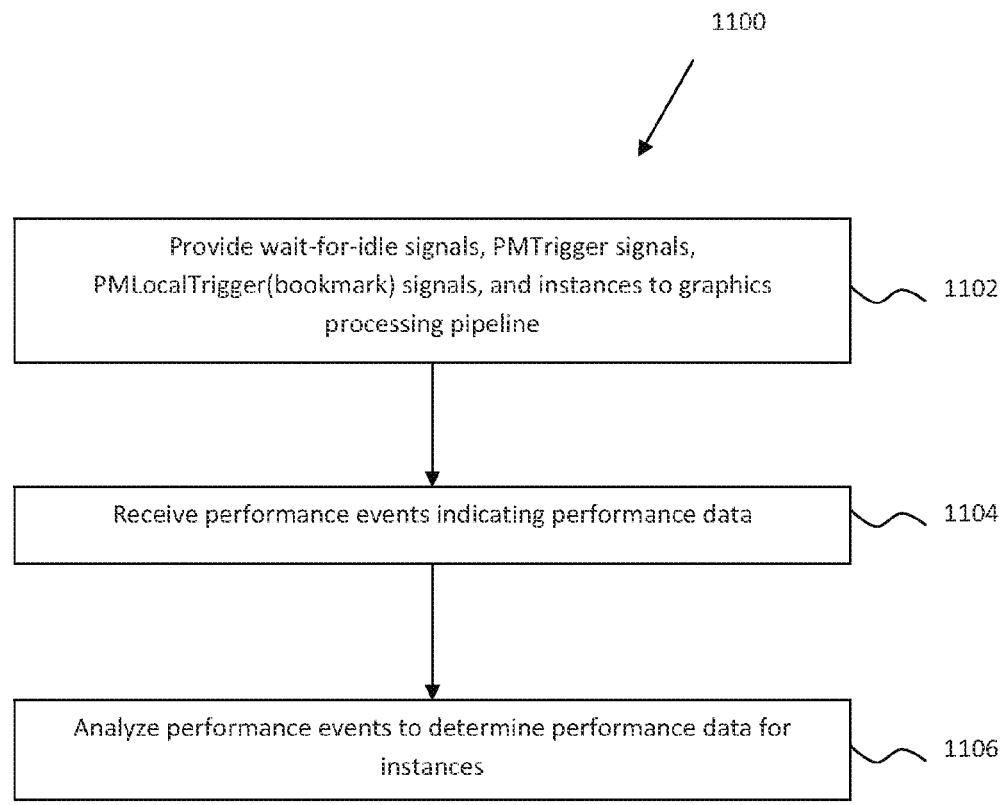
FIG. 11 is a flow diagram of method steps for analyzing the performance of a graphics processing pipeline, according to one embodiment of the present invention.

FIG. 11 is a flow diagram of method steps for analyzing the performance of a graphics processing pipeline 700, according to one embodiment of the present invention. Although the method steps are described in conjunction with FIGS. 1-4 and 7-8B, persons skilled in the art will understand that any system configured to perform the method steps, in any order, falls within the scope of the present invention.

As shown, a method 1100 begins in step 1102, where driver 103 issues wait-for-idle methods, PMTrigger methods, PMLocalTrigger(bookmark) methods, and instances to graphics processing pipeline 700. The pipeline begins processing the instances and generates performance events. In step 1104, driver 103 receives performance events that indicate performance data of graphics processing pipeline 700. In step 1106, driver 103 analyzes performance events to determine performance data for the instances sent into the pipeline. Analyzing performance events may comprise analyzing timestamps on different events to determine a duration for processing of a certain workload. Analyzing performance events may also comprise analyzing general purpose counters to determine an amount of a certain type of work performed by graphics processing pipeline 700, such as the number of pixels shaded while processing the various instances.

In sum, the above-described embodiments provide features for facilitating performance analysis of a graphics processing pipeline having a tiler unit. A driver is configured to send to a graphics processing pipeline a performance monitor trigger method. Local performance monitors are coupled to the tiler unit, and to a downstream position in the pipeline, such as ROP. The local performance monitors generate an "event" comprising performance related data such as a timestamp upon detection of the performance monitor trigger method. The tiler unit ensures that a performance monitor trigger method and corresponding bookmark identifying an instance are sent for each tract associated with each instance. For the first tract associated with an instance, the original performance monitor trigger method is already in the pipeline. However, for every tract after the first tract associated with a particular instance, the tiler unit generates a "replay" performance monitor trigger method and corresponding bookmark. The events generated by the local performance monitors can be sent out to memory and analyzed by software running on a computer to determine an elapsed time for the processing of each tract. Counters can be provided in events and may provide information related to an amount of a specific type of work processed for a particular tract.

An advantage of the above-described embodiments is that performance data may be obtained for a whole instance for a pipeline with a tiler unit that subdivides instances into tiles and interleaves tiles from different instances.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method of analyzing the performance of a graphics processing pipeline, the method comprising:
    combining a first workload and a second workload together in a pipeline to generate a combined workload, wherein the first workload is associated with a first instance, and the second workload is associated with a second instance;
    generating a first initial event for the combined workload, wherein the first initial event indicates that the first workload has begun processing at a first position in the graphics processing pipeline;
    generating a first final event for the combined workload, wherein the first final event indicates that the first workload has completed processing at a second position in the graphics processing pipeline;
    generating a second initial event for the combined workload, wherein the second initial event indicates that the second workload has begun processing at the first position in the graphics processing pipeline; and
    generating a second final event for the combined workload, wherein the second final event indicates that the second workload has completed processing at the second position in the graphics processing pipeline.

2. The method of claim 1, wherein each of the first initial event, the second initial event, the first final event, and the second final event comprises a timestamp, a performance monitor ID, and a bookmark value.

3. The method of claim 2, further comprising:
    determining a first processing time for the first workload by subtracting a timestamp included in the first initial event from a timestamp included in the first final event; and
    determining a second processing time for the second workload by subtracting a timestamp included in the second initial event from a timestamp included in the second final event.

4. The method of claim 3, further comprising:
    combining a third workload with the first workload and the second workload to generate the combined workload, wherein the third workload is associated with a third instance;
    generating a third initial event for the combined workload, wherein the third initial event indicates that the third workload has begun processing at the first position in the graphics processing pipeline;
    generating a third final event for the combined workload, wherein the third final event indicates that the third workload has finished processing at the second position in the graphics processing pipeline; and
    determining a third processing time for the third workload by subtracting a timestamp included in the third initial event from a timestamp included in the third final event.

5. The method of claim 1, wherein a tiler unit resides at the first position in the graphics processing pipeline, and a raster operations unit resides at the second position in the graphics processing pipeline.

6. The method of claim 1, wherein the first instance comprises a first plurality of related methods provided to the graphics processing pipeline, and the second instance comprises a second plurality of related methods provided to the graphics pipeline.

7. The method of claim 1, further comprising:
    generating a first intermediate event for the combined workload, wherein the first intermediate event indicates that the first workload has begun processing at a first intermediate position in the graphics processing pipeline; and
    generating a second intermediate event for the combined workload, wherein the second intermediate event indicates that the second workload has begun processing at the first intermediate position in the graphics processing pipeline,
    wherein the first position is an entry point of a tiler unit, the first intermediate position is an exit point of the tiler unit, and a raster operations unit resides at the second position.

8. The method of claim 7, further comprising:
    determining a first tiling time for the first workload by subtracting a timestamp included in the first initial event from a timestamp included in the first intermediate event;

determining a second tiling time for the second workload by subtracting a timestamp included in the second initial event from a timestamp included in the second intermediate event; and determining a count of a type of work completed for the first workload.

9. The method of claim 1, further comprising:

determining that the first workload is not an earliest workload received by a tiler unit associated with the first instance; and generating a replay for the first workload, the replay configured to cause a pipeline unit at the second position to generate a performance event.

10. A graphics processing pipeline configured to generate performance data, comprising:

a tiler unit configured to combine a first workload and a second workload together in the graphics processing pipeline to generate a combined workload, wherein the first workload is associated with a first instance, and the second workload is associated with a second instance;

a first local performance monitor coupled to the tiler unit and configured to:

generate a first initial event for the combined workload, wherein the first initial event indicates that the first workload has begun processing at a first position in the graphics processing pipeline, and generate a second initial event for the combined workload, wherein the second initial event indicates that the second workload has completed processing at the first position in the graphics processing pipeline; and a second local performance monitor configured to:

generate a first final event for the combined workload, wherein the first final event indicates that the first workload has begun processing at a second position in the graphics processing pipeline, and generate a second final event for the combined workload, wherein the second final event indicates that the second workload has completed processing at the second position in the graphics processing pipeline.

11. The graphics processing pipeline of claim 10, wherein each of the first initial event, the second initial event, the first final event, and the second final event comprises a timestamp, a performance monitor ID, and a bookmark value.

12. The graphics processing pipeline of claim 11, wherein the tiler unit is further configured to combine a third workload with the first workload and the second workload to generate the combined workload, wherein the third workload is associated with a third instance.

13. The graphics processing pipeline of claim 12, wherein:

the first local performance monitor is further configured to generate a third initial event for the combined workload, wherein the third initial event indicates that the third workload has begun processing at the first position in the graphics processing pipeline; and the second local performance monitor is further configured to generate a third final event for the combined workload, wherein the third final event indicates that the third workload has finished processing at the second position in the graphics processing pipeline.

14. The graphics processing pipeline of claim 10, wherein the tiler unit resides at the first position in the graphics processing pipeline, and a raster operations unit resides at the second position in the graphics processing pipeline.

15. The graphics processing pipeline of claim 10, wherein the first instance comprises a first plurality of related methods provided to the graphics processing pipeline, and the second instance comprises a second plurality of related methods provided to the graphics pipeline.

16. The graphics processing pipeline of claim 10, further comprising:

a third local performance monitor configured to:

generate a first intermediate event for the combined workload, wherein the first intermediate event indicates that the first workload has begun processing at a first intermediate position in the graphics processing pipeline, and generate a second intermediate event for the combined workload, wherein the second intermediate event indicates that the second workload has begun processing at the first intermediate position in the graphics processing pipeline, wherein the first position is an entry point of the tiler unit, the first intermediate position is an exit point of the tiler unit, a raster operations unit resides at the second position, and the second local performance monitor is coupled to the raster operations unit.

17. The graphics processing pipeline of claim 16, wherein the first local performance monitor, the second local performance monitor, and the third local performance monitor are further configured to determine a count of a type of work completed for the first workload and the second workload.

18. The graphics processing pipeline of claim 10, wherein the tiler unit is further configured to generate a replay signal.

19. A computing system comprising:

a graphics processing pipeline configured to:

process a first instance and a second instance to generate a first workload and a second workload, and combine a first workload and a second workload to form a combined workload;

a processor coupled to the graphics processing pipeline; and a memory coupled to the processor, wherein the memory includes a driver having instructions that, when executed by the processor, cause the processor to:

send, to the graphics processing pipeline, the first instance, the second instance, a first local performance monitor trigger, and a second local performance monitor trigger;

receive, from the graphics processing pipeline, a first initial event that indicates that the first workload has begun processing at a first position in the graphics processing pipeline;

receive, from the graphics processing pipeline, a first final event that indicates that the first workload has completed processing at a second position in the graphics processing pipeline;

receive, from the graphics processing pipeline, a second initial event that indicates that the second workload has begun processing at the first position in the graphics processing pipeline; and receive, from the graphics processing pipeline, a second final event that indicates that the second workload has completed processing at the second position in the graphics processing pipeline.

20. The computing device of claim 19, wherein the instructions further cause the processor to:

send, to the graphics processing pipeline, a third instance and a third local performance monitor trigger;

receive, from the graphics processing pipeline, a third initial event that indicates that a third workload has begun processing at the first position in the graphics processing pipeline; and receive, from the graphics processing pipeline, a third final event that indicates that the third workload has finished processing at the second position in the graphics processing pipeline.

* * * * *